United States Patent [19]

Velazquez

[11] Patent Number: 4,498,129

[45] Date of Patent: Feb. 5, 1985

[54] METHOD AND APPARATUS FOR NORMALIZING SERVO-POSITIONING SIGNALS

[75] Inventor: Juan F. Velazquez, Saline, Mich.

[73] Assignee: Irwin Magnetic Systems, Inc., Ann Arbor, Mich.

[21] Appl. No.: 280,127

[22] Filed: Jul. 2, 1981

[51] Int. Cl.³ .......................... G11B 5/54; G11B 21/10
[52] U.S. Cl. .................................... 364/174; 364/172; 364/173
[58] Field of Search .......................... 360/109, 77, 75; 369/43; 364/582, 173, 174, 183, 194, 172; 318/560; 340/347 R, 347 M

[56] References Cited

U.S. PATENT DOCUMENTS

| | | | |
|---|---|---|---|
| 3,443,178 | 5/1969 | Reuteler | 364/174 |
| 3,530,258 | 9/1970 | Gregg et al. | 369/43 |
| 3,551,752 | 12/1970 | Haner et al. | 364/173 |
| 3,691,543 | 9/1972 | Mueller | 340/174.1 B |
| 3,779,457 | 12/1973 | Covnyn, Jr. et al. | 364/582 |
| 3,818,502 | 6/1974 | Chien et al. | 360/77 |
| 4,004,205 | 1/1977 | Yamamoto et al. | 360/75 |
| 4,074,360 | 2/1978 | Stadie et al. | 364/173 |
| 4,085,427 | 4/1978 | Dunn | 360/77 |
| 4,135,217 | 1/1979 | Jacques et al. | 360/109 |
| 4,149,201 | 4/1979 | Card | 360/77 |
| 4,152,727 | 5/1979 | Tatsuguchi et al. | 369/43 |
| 4,204,234 | 5/1980 | Noble | 360/109 |
| 4,208,679 | 6/1980 | Hertrich | 360/77 |
| 4,245,298 | 1/1981 | Slater | 364/174 |
| 4,285,017 | 8/1981 | Arter et al. | 360/109 |
| 4,313,134 | 1/1982 | Rustman et al. | 369/43 |
| 4,334,276 | 6/1982 | Turnbull | 360/77 |

FOREIGN PATENT DOCUMENTS 2020858 11/1979 United Kingdom .

OTHER PUBLICATIONS

IBM Technical Disclosure Bulletin, Malta et al., vol. 22, No. 8A, Jan. 1980, "Track Servo System Compensating Defects".
IBM Technical Disclosure Bulletin, Kolakowski, vol. 21, No. 10, Mar. 1979, "Adaptive Gain Tracking of Sampled Servo Channel".
IBM Journal of Research & Development, vol. 18, No. 6, Nov. 1974, "Design of a Disk File Head-Positioning Servo", Oswald.
IBM Technical Disclosure, "Constant Position Gain Control", vol. 14, No. 6, Nov. 1971.

Primary Examiner—Gareth D. Shaw
Assistant Examiner—Jameson Lee
Attorney, Agent, or Firm—Price, Heneveld, Huizenga & Cooper

[57] ABSTRACT

Analog servo-positioning signals transduced from a recorded member, such as embedded servo signals recorded on a disc memory or the like, which are to be compared to one another in order to derive an error signal indicative of off-track position deviations, are normalized for accurate responsive positioning changes by use of an analog-to-digital converter referenced by both a positive and a negative summation of the two analog signals and supplied with the individual analog signals as inputs, such that the digitalized output comprises a pair of digital signals, the first representative of the quotient of the first analog signal divided by the summation of the two analog signals, and the second representative of the second analog signal divided by the same summation of analog signals. The two resulting digital signals are then processed in a microprocessor by subtracting the second such quotient-representative signal from the first, thereby providing a fully-normalized digital signal representative of the deviation from true position. An analog multiplexer is preferably used as a switching input to the A/D converter, and the latter comprises a multiplying-type A/D converter.

12 Claims, 7 Drawing Figures

METHOD AND APPARATUS FOR NORMALIZING SERVO-POSITIONING SIGNALS

BACKGROUND OF THE INVENTION

This invention relates to servo-positioning, particularly to the closed-loop servo-positioning techniques used in digital data recording and reproduction, particularly in disc-type record media, where positioning signals are recorded on the disc media for tracking purposes, as for example in systems of the type known as "embedded servo" positioning systems, where the positioning signals are in effect interspersed with the user data fields.

With the ever-increasing desires for achieving both greater quantities of data storage on record media, particularly discs, and for achieving components of smaller and smaller physical size, the recording tracks on record media continually become narrower and narrower, and packed more and more closely together, track densities greater than 500 per inch becoming ever more frequently discussed.

With such high track densities, it becomes mandatory to servo-control the transducer head so that it "locks on" to the desired track and "follows" such track over its actual configuration, rather than being held at a fixed concentric position relative to the disc and making the assumption, well known to be untrue, that the recording tracks are in fact perfectly circular and concentric with the disc.

In such servo-positioning systems, the disc media is frequently pre-recorded with marking signals disposed along the various recording tracks, which can be detected and utilized as servo loop control signals, such pre-recorded signals often being placed between successive user data fields and identified by the expressive term "embedded servo" signals.

Perhaps the most frequently-encountered systems for utilizing embedded servo tracking methods are based upon the principle that there will be analog differences, particularly amplitude differences, between signals transduced from recorded bursts which are disposed in a symmetrical pattern with respect to the recording track centerline if the transducer head is not then accurately aligned over that centerline. Such amplitude (or other analog) differences thus provide the basis for an error signal, which can be used to indicate the magnitude and direction of position changes which will bring the transducer into alignment with the center of the particular track involved.

In processing such signal differences, however, it is necessary to employ normalizing techniques, since the absolute magnitude of the differences will vary in a number of ways, for a number of reasons. Generally speaking, it is believed that the most typical approach heretofore followed in normalizing such signals was to sum the absolute magnitudes thereof and use the summation as an AGC feedback signal to an amplifier feeding the signal detectors, the output of such feedback-compensated pre-amplified detectors thus ostensibly producing the desired normalized signal. However, a number of difficulties arise in such a system, primarily because of variations in the absolute magnitude of the signals, and thus of the signal differences, leading to the introduction of very undesirable error sources and instabilities in the resulting servo-positioning.

SUMMARY OF THE INVENTION

The present invention provides a new and desirable error-signal normalizing concept, including method and apparatus for more directly and efficiently achieving the desired normalization, without providing for the introduction of error or system instability as occurred previously. Such result is achieved not only more effectively but also with greater economy, particularly by greater use of digital processing and components.

More particularly, the present invention provides for the digitizing, and digital normalizing, of the analog error signal components, and for achieving normalization through a process of directly obtaining a first and second normalized error-signal quotient, and then by subtracting one such quotient from the other, as opposed to the conventional approach achieved by a subtraction of absolute or analog values, a summation of analog values, and a division of the second into the first.

More particularly still, the present invention provides its novel results as a direct adjunct of, and as an integral part of, an analog-to-digital conversion step which, in a broad sense, is likely to be involved at some point in any such system, but which has not heretofore been considered or used as a part of the normalizing procedure.

The foregoing major objectives, advantages, and features of the present invention will become increasingly apparent upon consideration of the following detailed specification and attached drawings, in which prior procedures are noted and details of a preferred embodiment hereof are set forth and explained.

DESCRIPTION OF THE PREFERRED EMBODIMENTS

Figure 1:
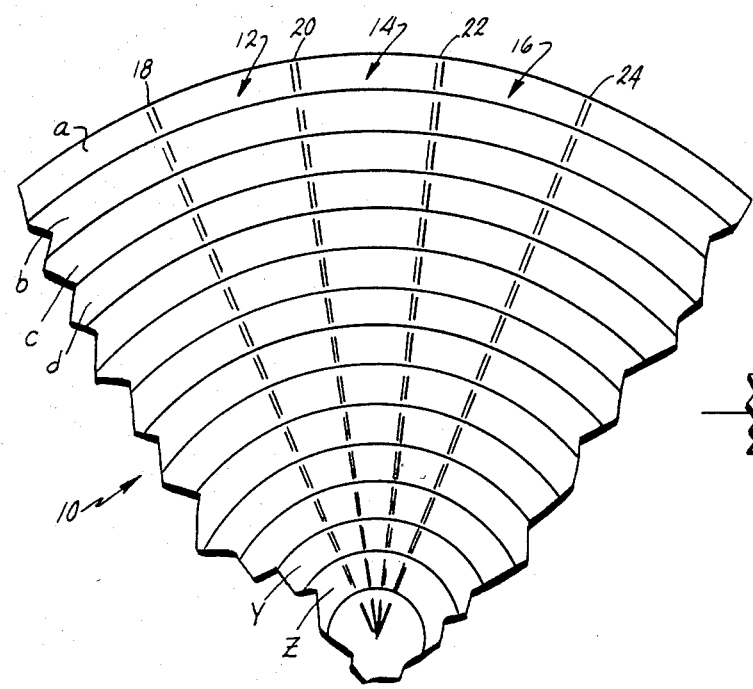
FIG. 1 is a fragmentary, pictorial depiction of a recording disc segment.

Referring now in more detail to the drawings, FIG. 1 depicts in a schematic and pictorial manner a segment of a recording disc 10, illustrating the same as having a number of generally concentric recording tracks a, b, c, d, etc., each of which, it will be understood, in reality would be a visually indistinguishable, exceedingly narrow concentric line of recorded transitions, tightly packed contiguous to the next adjacent concentric track. Typically, the record tracks a, b, c, etc., are divided into data sectors, such as are designated at 12, 14, 16, each comprising a wedge-shaped area delineated by a radius of the disc at either end. Along such delineating radii are typically position, in "embedded servo" disc recording formats, servo sectors which in FIG. 1 are designated by the numerals 18, 20, 22, 24, etc. It is to be understood that, in a more particular sense, various recording formats have been proposed, not all of which necessarily involve the use of servo sectors disposed along radii, but all of which use some generally analogous approach, radially-aligned servo sectors being very typically encountered.

Figure 2:
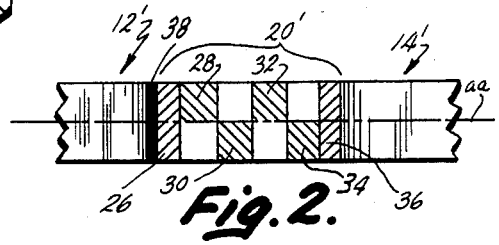
FIG. 2 is a greatly enlarged schematic depiction of a small segment of a single recording track of the recording disc of FIG. 1.

An exemplary segment of a recording track a' is depicted in FIG. 2, the same being shown for convenience as having a linear shape, which is to be understood as in fact being circularly curved, at least where the recording media is a disc. In the exemplary such segment of track a', data sectors are designated 12', 14', and the servo segment therebetween is designated by the numeral 20'.

Within the servo sector 20', a somewhat hypothetical recording format is depicted for purposes of illustration, the same being regarded as having certain features generally illustrative of many patterns actually in use.

More particularly, the servo sector 20' is shown for purposes of illustration as embodying a first record block 26, which may be considered as providing track-identification indicia, timing signals, etc. It will be noted that this first burst, or series of transitions, is in essence a full track wide, and it is followed by a series of alternating half-track-wide servo-positioning burst 28, 30, 32 and 34, the first such two (i.e., blocks 28 and 30) to be considered as a pair, and the second two (i.e., blocks 32 and 34) also to be considered as a pair. The servo sector 20' may terminate in a final full track-wide block 36, for example.

It will be noted that the servo-positioning bursts 28, 30, etc., are, as indicated above, one-half track wide, the same being centered upon a hypothetical centerline "aa" of recording track a', and extending outwardly to the lateral boundaries of such track. Thus, a track-wide transducer head, shown symbolically for purposes of illustration at 38, will reproduce the full amplitude of track-wide signal bursts such as 26 and 36, but will reproduce only one-half that much energy, e.g., amplitude, from the half-track-wide servo-positioning burst 28, 30, etc. Furthermore, if the transducer is centered exactly over centerline aa, the amplitude of each burst of signals transduced from servo blocks 28 and 30, for example, will be exactly equal, and would thus null out if compared. However, if the transducer head is shifted laterally one way or the other with respect to centerline aa, the transduced signals from the individual servo blocks 28 and 30 will be proportionally larger and smaller, depending upon which way the head happens to be shifted. That is, referring to FIG. 2, if the head 38 is shifted upwardly with respect to centerline aa a distance, for example, of one-fourth the track width, the full amplitude of block 28 would nonetheless still be reproduced, but the amplitude of block 30 would be reduced by approximately 50 percent.

Various specifically differing analog-type encoding formats are known or may be envisioned for embedded servo blocks which might be considered to be very broadly or generally similar to servo sector 20', but amplitude-type systems are perhaps the most typical presently encountered. Generally speaking, error signals are derived from such systems in generally analogous ways, i.e., basically by comparing two or more of the resulting signals reproduced from different points in the servo sector (e.g., blocks 28 and 30) and obtaining their differences. Where amplitude systems are involved, such difference comparisons will, of course, be readily understood, at least in a broad, general sense.

Figure 3A:
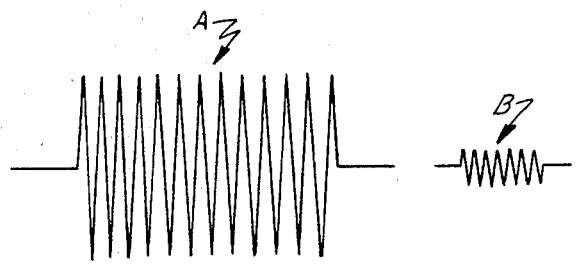
FIGS. 3A and 3B are enlarged schematic depictions of transduced signal patterns resulting from recorded transitions, for purposes of illustration.
Figure 3B:
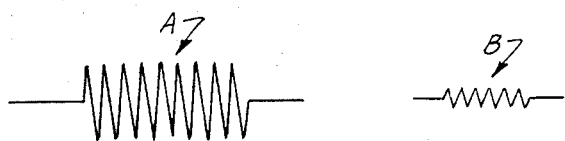

Nonetheless, embedded servo-tracking systems which operate on an amplitude-responsive basis, while perhaps being the most frequently encountered and in some ways the simplest, involve certain inherent tendencies toward errors and difficulties. For example, in the first place, the amplitude resulting from transducing signals in outer tracks such as a, b, etc., will be significantly greater than the amplitude resulting from signal transducing in the innermost tracks such as y and z. This occurs for two basic reasons: first, the relative velocity between the transducer and the recording track is substantially greater near the outer periphery of the disc and, in the second place, the bit-packing density is much greater in the innermost tracks. FIGS. 3a and 3b illustrate these conditions in a general way, FIG. 3a being illustrative of the greater signal amplitudes transduced from outer tracks, and FIG. 3b representing the relatively smaller amplitude transduced from inner tracks, for general comparison.

More particularly, FIGS. 3a and 3b illustrate in a general way relative signal amplitudes resulting from transducing servo burst patterns (such as servo blocks 28 and 30) from an off-center transducer position (i.e., a first transduced signal burst "A" representing a transducer positioned closer to a first servo block, i.e., block 28, and a second signal burst "B" representing transducer output from the ensuing complementary servo block 30, with the head in the same off-center position, i.e., further away from servo block 30). Thus, in tracking the innermost recording tracks, the absolute magnitude of the servo burst patterns may be relatively small. With respect to these showings, it should be borne in mind that even the larger-amplitude bursts "A" will only be, at most, half the normal amplitude resulting from a recorded transition which is a full track width wide, since the servo positioning bursts 28 and 30 are only half a track wide. Thus, it will be appreciated that a large position error (say, almost a half-track off the centerline) which occurs near the center of the disc will produce one error signal component (for example, a "B" burst) whose absolute magnitude is very small indeed.

Furthermore, it is generally well understood that recording disc media is not likely to produce uniform transducer output over its entire surface, even neglecting differences attributable to transducer-to-track relative velocity differences as noted above. That is, the recording and transducing characteristics of the disc media are simply not uniform over its entire periphery, and in some instances a relatively "dead" area may suddenly be encountered even where the head-to-disc distance or clearance remains absolutely uniform; of course, in reality this clearance of "flying height" does not remain absolutely uniform, for many, many reasons, inasmuch as the head "flies" aerodynamically above the surface of the disc on a film of air, and relatively minute changes in ambient air conditions within the disc drive are likely to affect such aerodynamic conditions from time to time, and the same is true even for changes in position of the transducer relative to the face of the disc.

A very substantial, or significant, source for additional error in amplitude or other analog-servoing techniques involves the processing of the position-indicating servo bursts A, B, both in conjunction with the anticipated wide differences in absolute magnitude expected to be encountered, as noted above, and in a more particular sense even the processing of less widely divergent relative signal magnitudes. That is, in the first place, it is of course known that the absolute magnitudes of the positioning signals cannot merely be subtracted one from the other and the difference used to generate an error signal, since a positioning error of, say, one-fourth track on an outer track (such as a, b, etc.) will produce a much larger absolute magnitude difference than will the same quarter-track positioning error on an innermost track (such as y, z, etc.), while exactly the same amount of transducer repositioning movement would be needed in both cases to bring the transducer back into alignment with the track center. Thus, normalizing of the absolute analog values is required, i.e., in accordance with classical concepts of the normalizing expression $(A-B/A+B)$.

Figure 4:
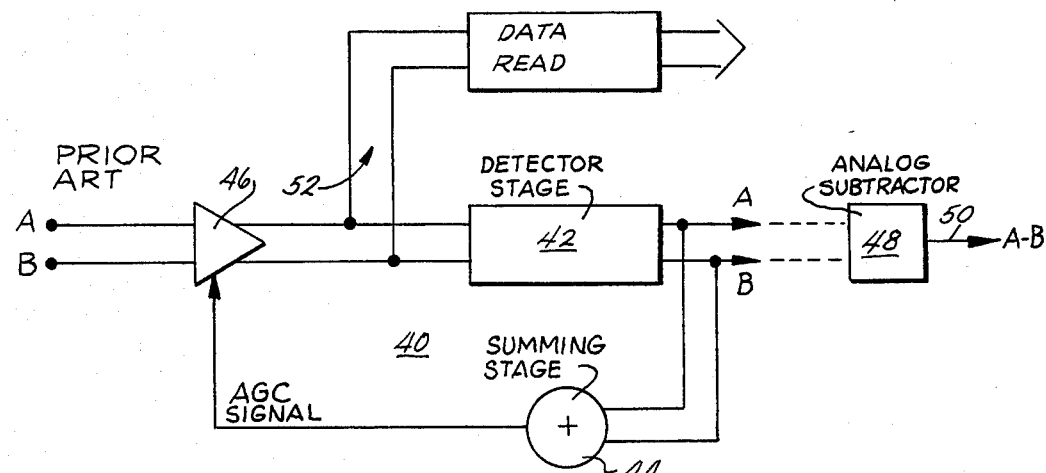
FIG. 4 is a block-form schematic representation of a characteristic prior art normalizing circuit.

It is in the particularities of the means utilized for implementing the aforementioned classical normalizing function that provides a substantial source of error. More particularly, as indicated in FIG. 4, perhaps the most frequently-encountered conventional approach for normalizing such error signals involves the use of a feedback loop 40 in which the absolute magnitudes of the transduced error signals A and B, obtained from the output of a detector stage 42, are summed by conventional summing network 44 and fed back as an AGC (automatic gain control) signal to the input amplifier 46 connected in the transducer read channel path and receiving the transduced bursts A, B which originate at the read head, or transducer. Thus, the AGC feedback comprises an "A+B" normalizing function signal, and the net effect is to make the detector stage a dividing circuit, i.e., all of the inputs being in effect divided by the summation A+B which is being used as feedback. Thus, by use of an analog subtracter circuit 48, the output appearing on output 50 of subtracter 48 is in effect a repesentation of the normalized function $(A-B/A+B)$.

The problem involved in use of a circuit approach such as is illustrated in FIG. 4 for achieving the normalizing purpose discussed is that the AGC feedback effect of the summation A+B primarily involves the gain-controlling effect of the circuit in the presence of transducing conditions actually encountered in disc recorders, as noted above. That is, under conditions such as that referred to in conjunction with FIG. 3(b), where the absolute magnitude of both signal A and signal B are diminished purely as a result of transducing conditions, the summation A+B of course diminishes also; however, when the summation is used as an AGC feedback signal, and the summation diminishes, the gain of the amplifier 46 is boosted substantially in response to the diminishing feedback function. The effect of this gain increase is, of course, a multiplication of the absolute magnitudes being supplied as inputs, and this in effect introduces distortions of non-servo signals (i.e., data) being received and supplied to other parts of the read system, along the path indicated at 52, the operational amplifier 46 not being limited to the servo channel. The end result is the introduction of potentially erratic or unstable circuit performance. For example, where the AGC-compensated amplifier gain has been pushed very high, noise components present in the incoming signal are similarly amplified, to the detriment of overall circuit performance and accuracy. Similarly, under circumstances where recording tracks closer to the center of the disc are being transduced and absolute magnitudes of transduced signals thereby are commensurately smaller, the AGC-compensated amplifier will already be exhibiting a relatively high gain which, when a "dead spot" of very low signal reproduction is encountered, the amplifier gain will be raised to its maximum level. With localized dead spots, the low-amplitude signal reproduction is only a very momentary condition, since the defective magnetic characteristics causing such an error will be highly localized. Therefore, the amplifier circuit will abruptly and almost instantaneously pass from the condition of maximum gain to the next instant where relatively normal-amplitude signals are transduced, but the time constant of the feedback loop is inevitably unable to respond instantly, causing the amplifier to be badly overdriven, into saturation and/or clipping, with resultant high levels of distortion in the output, very adversely affecting servo-positioning, data reading, etc.

Figure 5:
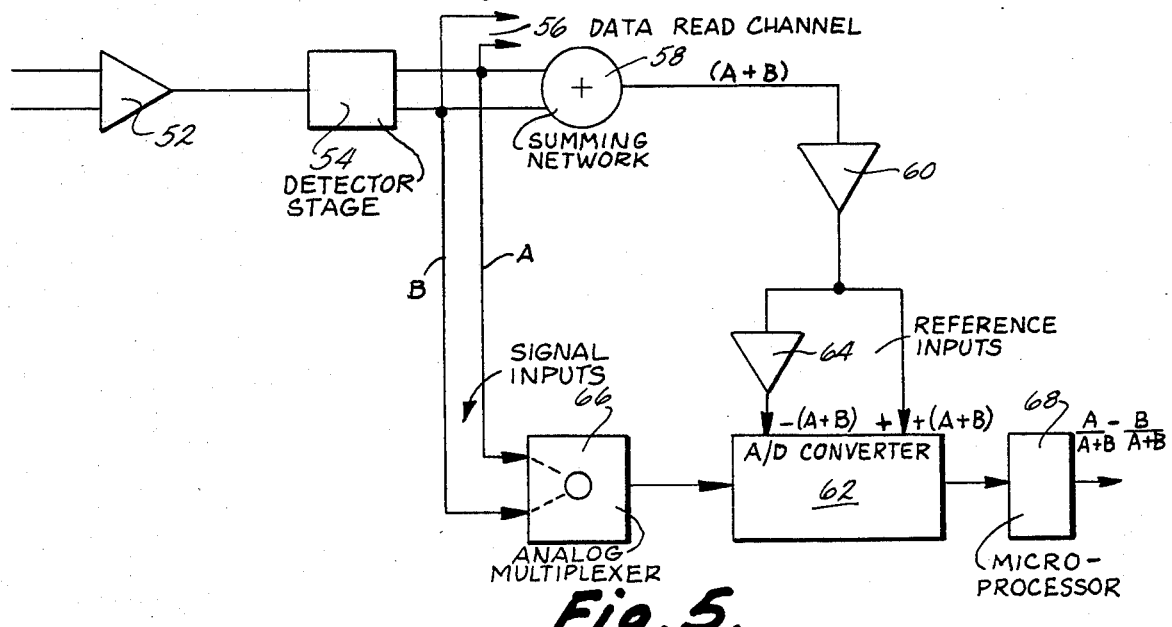
FIG. 5 is a schematic block diagram of apparatus pursuant to the present invention.

The present invention resolves the aforementioned problems and difficulties by proceeding on a different concept, which provides for the use of a relatively uncomplicated circuit approach, using a minimum of components but providing for significantly different results. As illustrated in FIG. 5, in accordance herewith the transduced input from the read head is provided to a first stage operational amplifier 52, and to a detector stage 54, from which data read signals are available to a data read channel 56, but the servo normalizing channel is quite different than in the case of FIG. 4. In the first place, the A and B outputs from detector 54 are summed by a summing network 58 and supplied, through an operational amplifier 60, as a positive-polarity reference to a multiplying-type analog-to-digital converter 62. This A+B signal summation is in effect inverted by an amplifier 64 having a gain of minus unity, whose output is supplied as the negative reference input to the multiplying A/D 62.

The signal inputs to the multiplying A/D 62 are provided by absolute-magnitude A, B signals from the output of detector 54, through an analog multiplexer 66, which in effect functions merely as a switching circuit, with the ability of selecting either the A signal or B signal for use as an input to the A/D converter 62.

Figure 6:
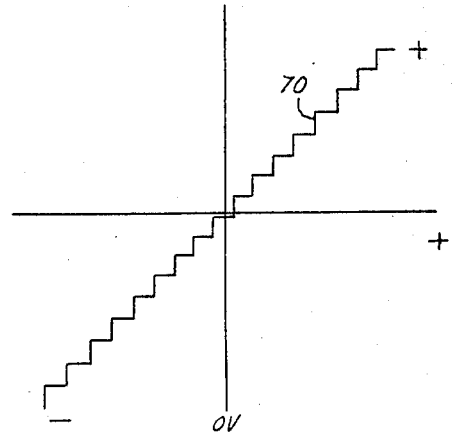
FIG. 6 is a graphical representation of certain response characteristics of the circuit of FIG. 5, for purposes of illustration.

With the aforementioned circuit arrangement, the analog inputs to the converter 62 are not only converted to digital form, but the conversion is accomplished as a function of the plus (A+B) function and the minus (A+B) function being supplied to the converter as reference inputs. This brings about normalization of the A signal and B signal components during conversion, in a manner generally illustrated by the step-function conversion characteristic 70 illustrated in FIG. 6. That is, the multiplying A/D converter 62 will, when supplied referencing inputs of the character noted, in effect ascribe a digital value in a proportioning manner, i.e., the absolute value of signal A will be compared to the absolute value of signal A plus signal B, and the resulting proportion is in effect what will be converted, or provided as an output from converter 62. Thus, the absolute magnitudes of input signals A and B are in effect cancelled out, the same proportion resulting from A and B inputs having an absolute magnitude of eight and four, for example, as would be true for A and B inputs having an absolute magnitude of two and one, respectively, since the proportion is the same in each case even though the absolute magnitudes differ markedly. Thus, in each case, the digital signal appearing as an output from converter 62 would be the same, and the effects of transducing amplitude variations will be eliminated.

Accordingly, the net effect of the circuit of FIG. 5 is to take each servo signal A and B in turn and compare each to the reference inputs constituting their algebraic summation. The resulting first and second digital outputs thus produced is then supplied to a microprocessor 68, which digitally subtracts the results to produce the desired normalized error signal. The results is achieved without any of the problematical effects introduced by the AGC loop shown and discussed in connection with FIG. 4, in particular, the sizable and unexpected shifts in the gain of the circuit. Conversely, the circuit of FIG. 5, in accordance herewith, is totally independent of any such feedback loop-recovery time considerations, only instantaneous values of servo signals A and B being examined at any particular instant. Thus, reduced to very simplified terms, the concept involved in the circuit of FIG. 4 is based on the apprehension that normalizing requires production of an (A−B) function, to be divided by an (A+B) function; conversely, the present invention, viewed from a similar conceptual standpoint, approaches the problem by producing a first quotient with only signal A in the numerator, and the normalizing function A+B in the denominator, then producing a similar quotient with only signal B in the numerator, and the same signal summation as a denominator, assigning digital values to the resulting proportional value achieved, and then subsequently subtracting the second such quotient-representative digital code from the first such code.

In accordance with a preferred embodiment of the apparatus involved, the analog multiplexer 66 may be implemented by the integrated circuit known under the designation AD7502, the multiplying A/D converter may be implemented by the integrated circuit designated AD7574, the microprocessor may comprise the chip designated 8741, and the other components such as operational amplifiers and detectors may be the same as have been used heretofore. The summing network may simply be a resistor network.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differs somewhat from the particular embodiments shown and described in detail herein, or may make various changes in structural details to the illustrated embodiment, all such alternative or modified embodiments which utilize the concepts of the invention and clearly incorporate the spirit thereof are to be considered as within the scope of the claims appended herebelow, unless such claims by their language specifically state otherwise.

I claim:

1. In a method of positioning wherein actual position is monitored in relation to desired position and electrical signals representative of differences between such actual and desired positions are used as a basis for making position corrections, the improved method of producing normalized positioning signals from first and second analog electrical signals which are representative of an actual position in relation to a desired position, said improved method comprising the steps of: using an analog-to-digital converter to convert each of said first and second analog electrical signals to first and second digital electrical signals whose values are modified and normalized representations of said actual position in relation to said desired position; said converter being so used by summing said first and second analog signals and applying a representation of their summation to a reference input of said converter while also applying said analog signals individually to said converter as conversion signal inputs for conversion to digital form; and operating said converter to make the digital conversion of said individual conversion input signals as a function of the applied reference input comprising said summation of signals, such that the converter outputs a first digital signal representative of the quotient of the value of the first said analog signal value and the sum of the first and second said analog signal values and a second digital signal representative of the quotient of the second said analog signal value and the sum of the first and second analog signal values; and digitally processing said first and second digital signals by subtracting one from the other thereof to thereby produce a resultant digital electrical signal representative of the quotient whose numerator comprises the difference between the first representative-value digital signal and the second such digital signal, and whose denominator comprises the sum of the same two digital signals; said method of positioning further comprising the steps of using said resultant digital signal as the basis for making positioning corrections by moving from said actual position toward the desired position as a function of the value of said resultant signal.

2. The method as defined in claim 1, including the step of applying a second reference signal to said converter which represents the negative analog summation of said first and second analog error signals.

3. The method as defined in claim 1, including the step of subtracting the second said quotient from the first said quotient by use of a microprocessor.

4. The method as defined in claim 1, wherein said steps of applying said first and second conversion signal inputs to said converter are carried out by use of an analog multiplexer.

5. The method as defined in claim 4, including the step of applying a second reference signal to said converter which represents the negative analog summation of said first and second analog error signals.

6. Apparatus for producing normalized positioning signals from first and second analog signals which are representative of an actual position in relation to a desired position, said apparatus comprising in combination: analog-to-digital converter means having at least one referencing input terminal and at least one conversion signal input terminal, and having an output terminal; circuit means for separately applying said first and second analog signals to said at least one conversion signal input terminal; circuit means for obtaining and applying a summation of said first and second analog signals to said at least one referencing input terminal during separate applications of said analog signals to said at least one conversion signal input terminal, such that conversion of each such analog signal input to digital form output occurs in relation to said summation of signals as a reference value; and means for digitally processing in combination the respective reference-converted digital outputs from said analog-to-digital converter means corresponding to said separate applications to produce a resultant digital signal which represents the quotient of the difference between said first and second analog signals and the sum of such first and second analog signals.

7. The apparatus as defined in claim 6, wherein said circuit means for obtaining and applying a summation of said first and second analog signals to said at least one referencing input terminal comprises an analog summing network with amplifier means.

8. The apparatus as defined in claim 7, wherein there are at least two referencing input terminals and said circuit means for applying said summation comprises a positive-polarity signal path and an inverting signal path, said positive-polarity path being coupled to apply a positive summation of said first and second analog signals to a first one of said at least two referencing input terminals and said negative-polarity path being coupled to apply a negative summation of said first and second analog signals to a second one of said at least two referencing input terminals.

9. The apparatus as defined in claim 6, wherein said circuit means for separately applying said first and second analog signals to said conversion signal input terminal comprises a switching circuit means for receiving both such analog signals and for selectively supplying each thereof to the said converter via said conversion signal input terminal.

10. The apparatus as defined in claim 9, wherein said switching circuit means comprises an analog multiplexer.

11. The apparatus as defined in claim 10, wherein there are at least two referencing input terminals and said circuit means for applying a summation of said first and second analog signals to said at least two referencing input terminals comprises an analog summing network with amplifier circuit means, and wherein said amplifier circuit means comprises a positive-polarity signal path and an inverting signal path, said positive-polarity signal path for applying a positive summation of said first and second analog signals to one of said at least two referencing input terminals, and said inverting signal path for applying a negative summation of said first and second analog signals to a different one of said at least two referencing input terminals.

12. The apparatus as defined in claim 11, wherein said means for digitally processing the output of said analog-to-digital converter means comprises a microprocessor.

* * * * *